US011562372B2

United States Patent
Pati et al.

(10) Patent No.: US 11,562,372 B2
(45) Date of Patent: Jan. 24, 2023

(54) PROBABILISTIC FEATURE ENGINEERING TECHNIQUE FOR ANOMALY DETECTION

(71) Applicant: Actimize LTD., Ra'anana (IL)

(72) Inventors: Debabrata Pati, Pune (IN); Akshaykumar Bhausaheb Tilekar, Ahmednagar (IN); Shevale Ashish Suhas, Pune (IN)

(73) Assignee: ACTIMIZE LTD, Ra'anana (IL)

( * ) Notice: Subject to any disclaimer, the term of this patent is extended or adjusted under 35 U.S.C. 154(b) by 127 days.

(21) Appl. No.: 16/892,333

(22) Filed: Jun. 4, 2020

(65) Prior Publication Data

US 2021/0383407 A1    Dec. 9, 2021

(51) Int. Cl.
*G06Q 30/00* (2012.01)
*G06F 16/23* (2019.01)
*G06N 7/00* (2006.01)
*G06Q 40/00* (2012.01)
*G06N 20/00* (2019.01)
*G06Q 50/26* (2012.01)

(52) U.S. Cl.
CPC ..... *G06Q 30/0185* (2013.01); *G06F 16/2379* (2019.01); *G06N 7/005* (2013.01); *G06N 20/00* (2019.01); *G06Q 40/12* (2013.12); *G06Q 50/265* (2013.01)

(58) Field of Classification Search
None
See application file for complete search history.

(56) References Cited

U.S. PATENT DOCUMENTS

| | | | |
|---|---|---|---|
| 10,204,374 B1* | 2/2019 | Holan | G06Q 30/0637 |
| 10,924,514 B1* | 2/2021 | Altman | G06N 7/005 |
| 2006/0074986 A1* | 4/2006 | Mallalieu | G06F 21/32 |
| 2019/0385170 A1* | 12/2019 | Arrabothu | G06N 7/005 |
| 2020/0090003 A1* | 3/2020 | Marques | G06F 17/18 |
| 2020/0175421 A1* | 6/2020 | Zhou | G06N 20/10 |

* cited by examiner

*Primary Examiner* — Ariel J Yu
(74) *Attorney, Agent, or Firm* — Soroker Agmon Nordman

(57) ABSTRACT

A computerized-method for generating a dataset for a Machine Learning (ML) model for an increased accurate financial crime detection from an initiation stage of the ML model implementation. The computerized-method includes: retrieval of financial transaction records from a database of financial transaction records to arrange a dataset of financial transaction records, according to preconfigured techniques. Then, processing the records in the dataset; Then, operating feature engineering on preselected anomalous related features to yield probabilistic categorical features and to yield probabilistic numerical features, and then combining the probabilistic categorical features with the probabilistic numerical features to generate a complex features dataset, and providing the probabilistic categorical features, the probabilistic numerical features and the complex features dataset to an ML model, thus, increasing accuracy of detection that is performed right from an initiation stage of the ML model implementation.

14 Claims, 9 Drawing Sheets

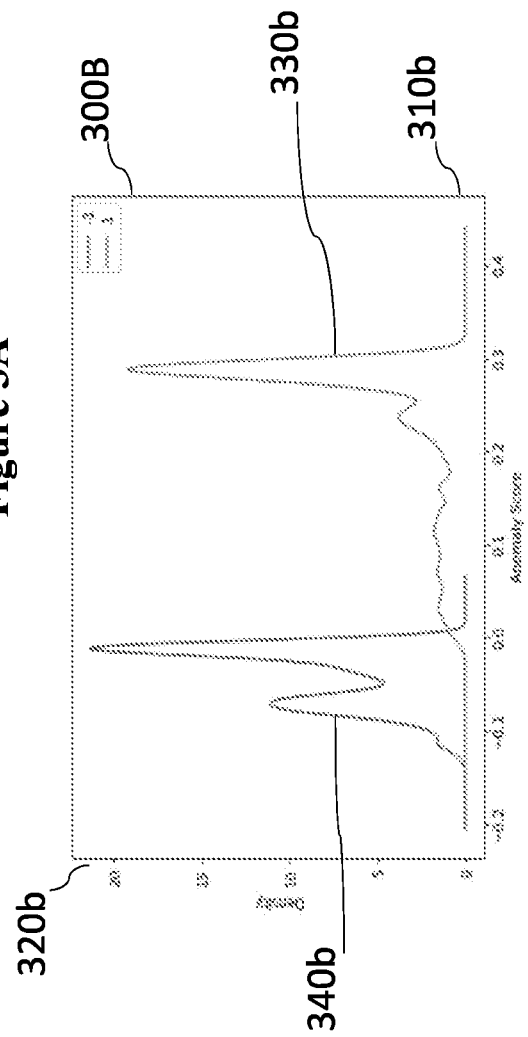

| Country_Code |
|---|
| USA |
| ISRAEL |
| ISRAEL |
| USA |
| INDIA |
| USA |
| ISRAEL |
| ISRAEL |
| USA |
| INDIA |
| UK |
| UK |
| UK |
| LIBYA |

| Country_Code | Frequency | Inverse_Frequency | Inverse Probability Ratio |
|---|---|---|---|
| INDIA | 10000 | 0.00010 | 0.00008 |
| ISRAEL | 50000 | 0.00002 | 0.00002 |
| LIBYA | 1 | 1.00000 | 0.83324 |
| UK | 5 | 0.20000 | 0.16665 |
| USA | 70000 | 0.00001 | 0.00001 |

Inverse sum 1.200134286

$$IPR(X_j) = \frac{1}{X_{jj}} / \sum \frac{1}{X_{jj}}$$

| Transaction no | Country_Code | transaction_value($) |
|---|---|---|
| t1 | USA | 363 |
| t2 | ISRAEL | 650 |
| t3 | ISRAEL | 729 |
| t4 | USA | 331 |
| t5 | INDIA | 100 |
| t6 | USA | 154 |
| t7 | ISRAEL | 597 |
| t8 | ISRAEL | 567 |
| t9 | USA | 493 |
| t10 | INDIA | 647 |
| t11 | UK | 420 |
| t12 | UK | 549 |
| t13 | UK | 172 |
| t14 | LIBYA | 1000 |

810

| Transaction no | Country_Code(PR) | transaction_value($) Probability_score | complex_feature |
|---|---|---|---|
| t1 | 1.19034E-05 | 0.036333472 | 4.32493E-07 |
| t2 | 1.66648E-05 | 0.010078805 | 1.67965E-07 |
| t3 | 1.66648E-05 | 0.409616912 | 6.82618E-06 |
| t4 | 1.19034E-05 | 0.165710717 | 1.97253E-06 |
| t5 | 8.3324E-05 | 0.015144937 | 1.26194E-06 |
| t6 | 1.19034E-05 | 0.001003361 | 1.23035E-08 |
| t7 | 1.66648E-05 | 0.047820025 | 7.96911E-07 |
| t8 | 1.66648E-05 | 0.045497363 | 7.58205E-07 |
| t9 | 1.19034E-05 | 0.006052393 | 7.20442E-08 |
| t10 | 8.3324E-05 | 0.193104835 | 1.60903E-05 |
| t11 | 0.166648018 | 0.126591418 | 0.021096209 |
| t12 | 0.166648018 | 0.041970619 | 0.00699432 |
| t13 | 0.166648018 | 0.5 | 0.083324009 |
| t14 | 0.833324009 | 0.653640316 | 0.544639316 |

PROBABILISTIC FEATURE ENGINEERING TECHNIQUE FOR ANOMALY DETECTION

TECHNICAL FIELD

The present disclosure relates to the field of anomaly detection and risk analysis. More specifically, the invention belongs to advanced probabilistic feature engineering for generating a dataset of features for a Machine Learning model for a more accurate detection of anomaly such as risk or financial crime.

BACKGROUND

Financial institutions are becoming more sensitive to a continuing increase in the cost of their fraud and financial crime compliance activities. Accordingly, financial institutions are in a constant search for a better and faster ways to identify fraud events to stay ahead of money laundering, fraud and other financial crime activities. In addition to reduction of cost caused by fraud, avoiding low customer satisfaction due to fraud activity, remains at the forefront of concern for these financial institutions. Accordingly, financial institutions are seeking ways to detect proper oversight and compliance measures in a way that is less obtrusive and doesn't significantly detract from business operations.

Machine learning (ML) models which are implemented in the financial institutions systems, commonly improve automatically through experience, meaning, over time and not right after their initiation in the financial institutions systems. However, there is a growing demand from the financial institutions, for ML models to be applies right after they initiate viz, start sending data, when fraud events data is commonly not available or very rare. The ramifications of the rarity of the fraud data is that there is no data or only limited fraud data which makes it difficult to fully study all the fraud data details for later on classification and detection, as such, by the ML models.

Accordingly, there is a need for a technical solution for improving the accuracy of the detection of fraud at an early stage, i.e., at the initial stage itself, without waiting until a specified amount of fraud financial transactions, are being tagged.

Furthermore, current approaches, which are used for anomaly detection and classification, implement feature engineering of features which are too generic in nature. Meaning, these approaches are not focused on anomalous related features, such as risk-based feature values identification. Hence, there is a need for a system and method for generating a dataset for a Machine Learning (ML) model for a more accurate anomaly detection, such as, financial crime detection, i.e., fraud events.

In other words, there is a need for a system and method for generating a representative dataset of the data as a whole by creating or engineering features which are anomalous related. Thus, when the needed generated representative dataset is provided to an ML model, the ML model will more accurately detect anomaly events, such as, financial crime. Meaning, the ML model will prioritize or highlight the anomalous data, e.g., financial transactions, by binarizing data in a crisp and efficient manner even with no data or limited fraud data.

SUMMARY

There is thus provided, in accordance with some embodiments of the present disclosure, a computerized-method for generating a dataset for a Machine Learning (ML) model for increased accurate financial crime detection from an initiation stage of the ML model implementation.

In accordance with some embodiments of the present disclosure, in a computerized system comprising a processor, a database of financial transaction records, a memory to store the database, said processor may be configured to operate a Representative Dataset Generation (RDG) module.

In accordance with some embodiments of the present disclosure, the RDG module may be configured to retrieve financial transaction records from the database of financial transaction records to arrange a dataset of financial transaction records, according to preconfigured techniques.

Furthermore, in accordance with some embodiments of the present disclosure, the RDG module may be further configured to process the financial transaction records in the dataset and then to operate feature engineering on preselected anomalous related one or more features to yield one or more probabilistic categorical features and to yield one or more probabilistic numerical features, and combine the probabilistic categorical features with the probabilistic numerical features to generate a complex features dataset.

Furthermore, in accordance with some embodiments of the present disclosure, the RDG module may be configured to provide the one or more probabilistic categorical feature, the one or more probabilistic numerical feature and the complex features dataset to an ML model, thus, increasing accuracy of detection that is performed right from an initiation stage of the ML model implementation.

Furthermore, in accordance with some embodiments of the present disclosure, the processing of the financial transaction records in the dataset may be further performed by performing: (i) data validation for completeness and missing attributes on the retrieved financial transaction records; and (ii) fraud tagging and fraud enrichment to yield tagged financial transaction records.

Furthermore, in accordance with some embodiments of the present disclosure, the operated feature engineering may be further comprising: categorical feature encoding using inverse probability ratio and numerical feature encoding using Gaussian probability density function.

Furthermore, in accordance with some embodiments of the present disclosure, after providing the one or more probabilistic categorical features, the one or more probabilistic numerical features and the complex feature dataset to the ML model, the RDG module may be further configured to perform model tuning, training and testing.

Furthermore, in accordance with some embodiments of the present disclosure, the model tuning, training and testing may be performed by Anomaly Detection Model (ADM) tuning; (b) ADM training; and (c) ADM testing and validation.

Furthermore, in accordance with some embodiments of the present disclosure, after providing the one or more probabilistic categorical features, the one or more probabilistic numerical features and the complex feature dataset to the ML model, when the number of yielded tagged financial transaction records is above a predefined threshold, the RDG module is further configured to perform: (i) Supervised Model (SVM) tuning; (ii) SVM training; and (iii) SVM testing and validation.

Furthermore, in accordance with some embodiments of the present disclosure, the ADM tuning, ADM training and ADM testing and validation may be performed according to an Isolation Forest algorithm.

Furthermore, in accordance with some embodiments of the present disclosure, the preconfigured techniques may include: random sampling, time-based sampling, stratified sampling, other type of sampling or any combination thereof.

There is further provided, in accordance with some embodiments of the present disclosure, a computerized-system for generating a dataset for a Machine Learning (ML) model for an increased accurate financial crime detection from an initiation stage of the ML model implementation.

According to some embodiments, the computerized-system may include: a processor, a database of financial transaction records, and a memory to store the database. The processor may be configured to operate Dataset Generation (RDG) module.

Furthermore, in accordance with some embodiments of the present disclosure, the RDG module is configured to retrieve financial transaction records from the database of financial transaction records to arrange a dataset of financial transaction records, according to preconfigured techniques.

Furthermore, in accordance with some embodiments of the present disclosure, the RDG module may be further configured to process the financial transaction records in the dataset and then to operate feature engineering on preselected anomalous related one or more features to yield one or more probabilistic categorical features and to yield one or more probabilistic numerical features, and combine the probabilistic categorical features with the probabilistic numerical features to generate a complex features dataset.

Furthermore, in accordance with some embodiments of the present disclosure, the RDG module may be configured providing the one or more probabilistic categorical feature, the one or more probabilistic numerical feature and the complex features dataset to an ML model, thus, increasing accuracy of detection that is performed right from an initiation stage of the ML model implementation.

Furthermore, in accordance with some embodiments of the present disclosure, the processing of the financial transaction records in the dataset may be further performed by performing: (i) data validation for completeness and missing attributes on the retrieved financial transaction records; and (ii) fraud tagging and fraud enrichment to yield tagged financial transaction records.

Furthermore, in accordance with some embodiments of the present disclosure, the operated feature engineering may be further comprising: categorical feature encoding using inverse probability ratio and numerical feature encoding using Gaussian probability density function.

Furthermore, in accordance with some embodiments of the present disclosure, after providing the one or more probabilistic categorical features, the one or more probabilistic numerical features and the complex feature dataset to the ML model, the RDG module may be further configured to performing model tuning, training and testing.

Furthermore, in accordance with some embodiments of the present disclosure, the model tuning, training and testing may be performed by Anomaly Detection Model (ADM) tuning; (b) ADM training; and (c) ADM testing and validation.

Furthermore, in accordance with some embodiments of the present disclosure, after providing the one or more probabilistic categorical features, the one or more probabilistic numerical features and the complex feature dataset to the ML model, when the number of yielded tagged financial transaction records is above a predefined threshold, the RDG module is further configured to perform: (i) Supervised Model (SVM) tuning; (ii) SVM training; and (iii) SVM testing and validation.

Furthermore, in accordance with some embodiments of the present disclosure, the ADM tuning, ADM training and ADM testing and validation may be performed according to an Isolation Forest algorithm.

Furthermore, in accordance with some embodiments of the present disclosure, the preconfigured techniques may include: random sampling, time-based sampling, stratified sampling, other type of sampling or any combination thereof.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

FIG. 3A is a table of an anomaly score output from an Isolation forest model, in accordance with some embodiments of the present disclosure;

FIG. 3B is a graph showing the probability density function on Isolation forest anomaly detection risk score, in accordance with some embodiments of the present disclosure;

FIG. 7 shows results of a calculation of inverse probability ratio of occurrences for categorical variables, in accordance with some embodiments of the present disclosure; and FIG. 8 shows results of a calculation of feature complex, in accordance with some embodiments of the present disclosure.

DETAILED DESCRIPTION

Figure 1:
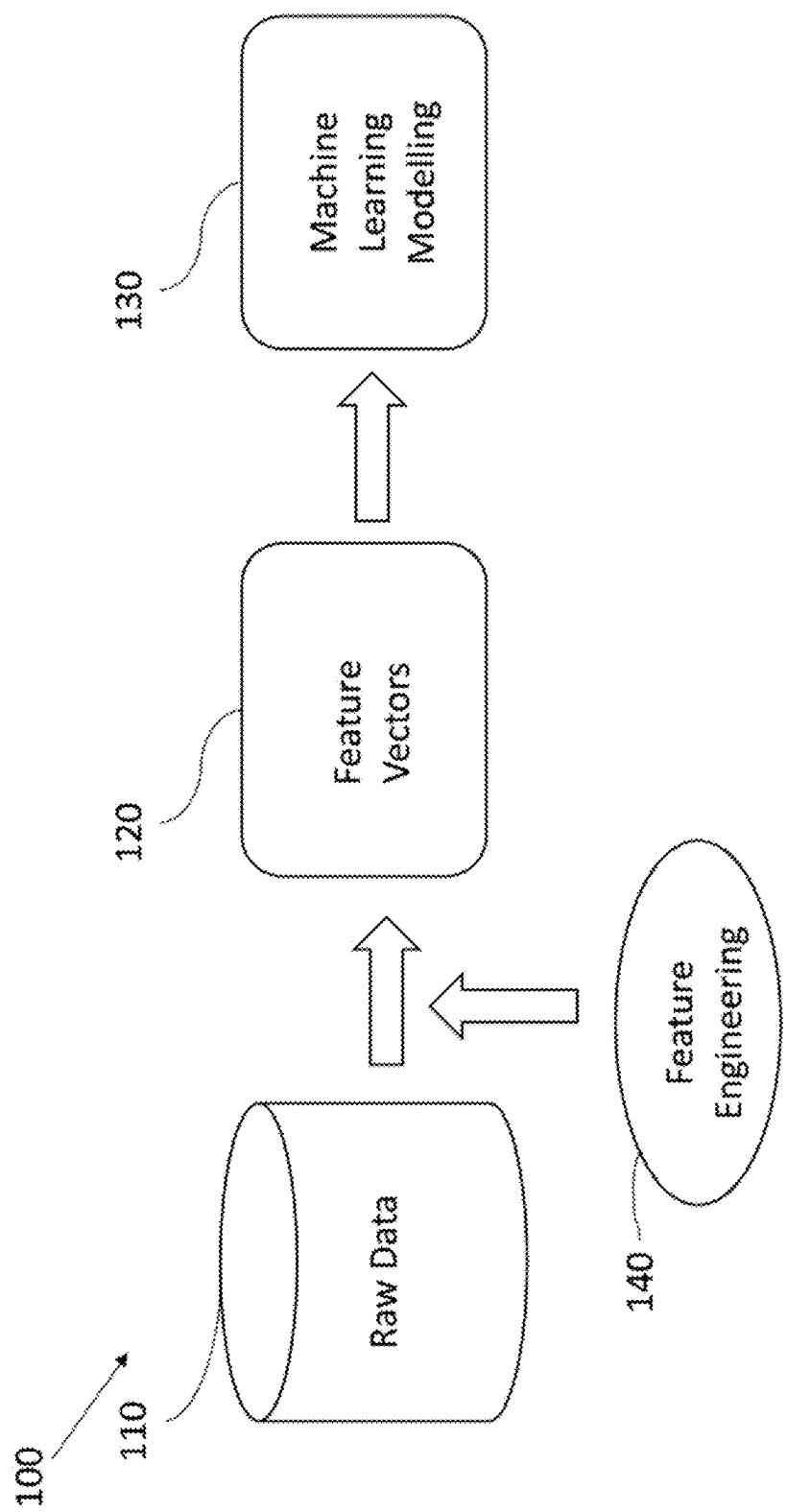
FIG. 1 schematically illustrates a feature engineering process.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "feature" or "variable" as used herein refer to an individual measurable property or characteristic of a phenomenon being observed that is related to a problem statement or to an anomalous event.

The term "complex feature" as used herein refers to a feature that is combined of multiple values.

The term "feature engineering" as used herein refers to a step in a process of anomaly detection modelling. It is a way to hone an ML model, by adding and improving the features of the dataset that is provided to it.

The term "sparse dataset" as used herein refers to a dataset that is comprised of data points in which most attributes' value in each data point equals zero. For example, a data point in a sparse dataset which represents a financial transaction may consist of attributes with the following values: [1,23,0,0,0,4,'abc',0,0,0,0,0,0,0,0,0,0,0,0,0,0].

The terms "categorial feature" or "categorial variable" as used herein refer to data that has discrete values which belong to a specific finite set of categories or classes. For example, blood type: A, B, AB or O. Another example may be bank account type: savings, checking, money market, certificate of deposit or retirement. Yet another example may be client type: Very Important People (VIP), business or private and the like.

The term "inverse probability ratio" as used herein refers to a probability-based feature encoding approach for categorical data. The approach aims to: (i) find relative distribution of a value with respect to other values which are associated with that categorical feature; and (ii) highlight anomalous values.

The term "Machine Learning (ML) model" as used herein refers to a mathematical model that is built based on ML algorithms and based on a representative dataset, to make predictions, when explicit programming is infeasible.

The term "Support Vector Machine (SVM)" as used herein refers to supervised learning models of ML that analyze data for classification.

The term "gaussian distribution" as used herein refers to a normal distribution of values.

The term "transformation method" as used herein refers to an activity in a model building process which is performed with an initial set of measured data and builds derived values intended to be informative and non-redundant. The derived values are facilitating the subsequent learning and generalization steps.

The term "e number" as used herein refers to a mathematical constant which approximately equals to 2.71828.

The term "Receiver Operating Characteristic (ROC)" as used herein refers to a curve in a graph that is created by plotting the True Positive Rate (TPR) against the False Positive Rate (FPR) at various threshold settings.

The term "representative dataset" as used herein refers to a dataset that includes items which represent the data as a whole. For example, a representative dataset of an Automatic Teller Machine (ATM) transactions in a certain state may include features such as frequency of various types of ATM transactions or the total amount of these transactions. For example, transactions from a certain ATM machine in a certain period of time, in which even a single fraud has been confirmed, e.g., a fraud has occurred on 25 May 2020, at 11:00 PM, then all the transactions which were performed between May 25, 2020, at 8:00 PM to May 26, 2020, at 2:00 AM may be considered as representative transaction dataset (i.e., in a +−3 hours window).

The terms "variable" and "feature" are interchangeable.

Commonly, behavioral anomaly detection systems use supervised machine learning models to detect behavior anomalies in fraudsters transactions and communications. The traditional detection methods and systems, implement supervised Machine Learning (ML) models which have to run on the databases of the financial institution systems for a certain period of time, until they are able to detect anomalous data, such as financial crime, meaning more accurately classifying transactions as fraud or non-fraud.

Therefore, there is a need for a system and method for generating a representative dataset for ML model for a more accurate financial crime detection that may operate in an unsupervised manner viz, right from the implementation phase in the financial institutions systems.

According to some embodiments of the present disclosure, a more accurate detection of a financial crime, may be achieved earlier and faster with minimum False-Positives (FP)s, with maximum True-Positives (TP)s and without missing fraudulent events in the systems of the financial institutions.

Financial institutions such as banks have an account related to a person or other entity like a corporation or business or houses etc. These accounts may be of different types such as, current accounts, saving accounts or loan accounts, and the like. Individual accounts which are associated with a single entity, or multiple owners may be related as entities. These entities may transact between each other to transfer money via different channels. These channels can be Online banking, phone banking, Cheques, etc. The entity that transfers the money may be related as the source entity or originator and the entity that receives the money may be related as the destination entity or payee.

According to some embodiments of the present disclosure, in the context of financial institutions, anomalous related features such as risk-based features or fraud related features, may be for example, an amount that is transferred between entities, the frequency of transfers in a preconfigured period of time, the type of the entities, type of transfer channels and the like.

FIG. 1 schematically illustrates a feature engineering process 100.

According to some embodiment of the present disclosure, feature vectors 120 such as complex features, may be generated by applying feature engineering process 140 on selected anomalous related features form the data stored in a raw data database 110. The generated feature vectors 120 may be provided as an input to an ML modelling 130 for an increased accuracy and scalability of the ML model operation.

Suspicious entities may be financial accounts in which at least one fraud had occurred in the past. These suspicious accounts are considered as more prone to fraud in the future. The systems of the financial institutions may mark and maintain throughout the life span based on past exercise of detecting fraudulent activity. The marking may be performed for a sampling operation such as fraud and clean data sampling 220 in FIG. 2. For example, if a fraud transaction has been processed via an ATM, then the ATM ID i.e., entity may be under suspicion, and samples may be taken from that ATM for modeling such as ML modelling 130.

Figure 2A:
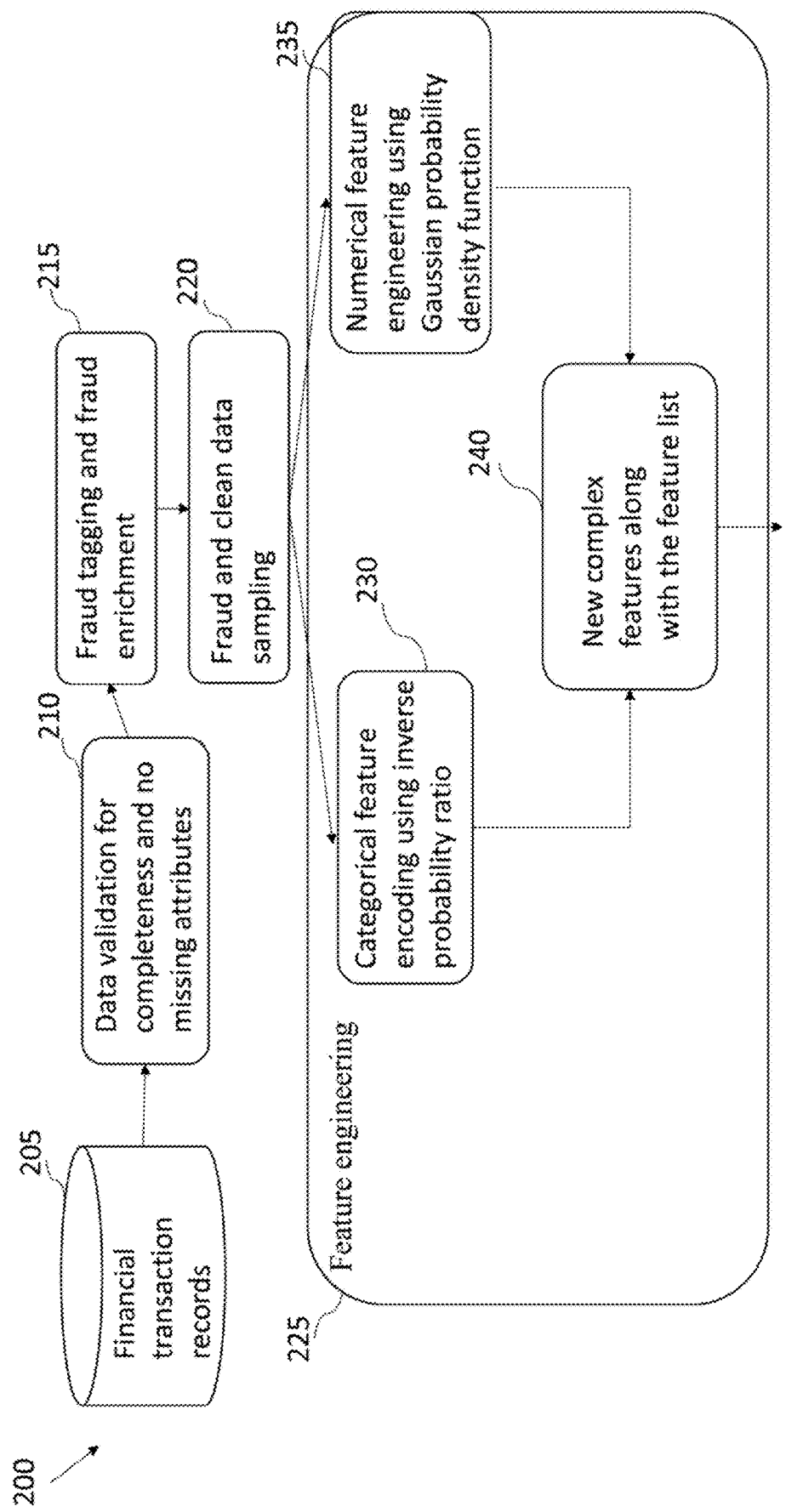
FIGS. 2A-2B are a high-level diagram that illustrates feature engineering phase in model building platform, in accordance with some embodiments of the present disclosure.
Figure 2B:
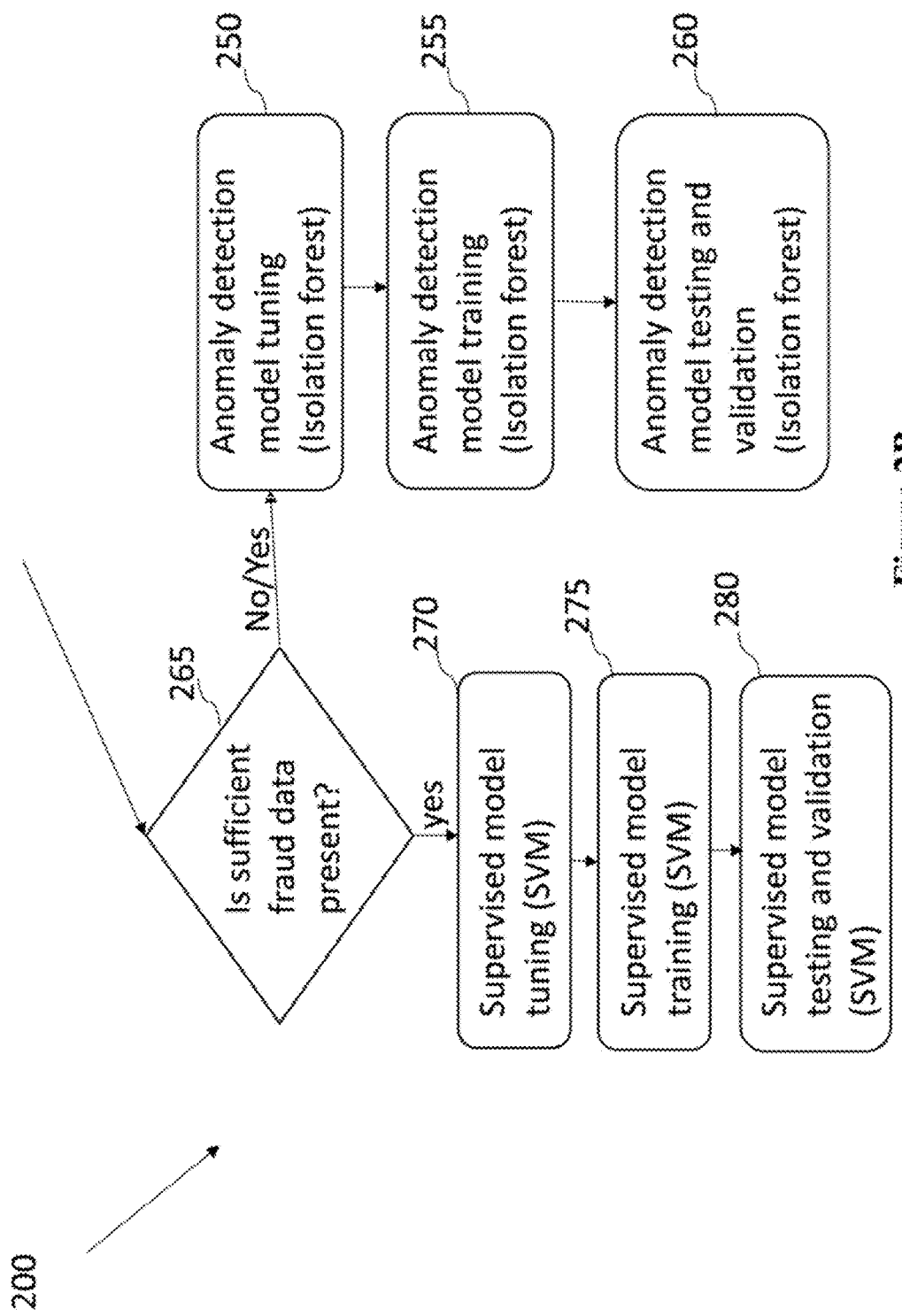

FIGS. 2A-2B are a high-level diagram 200 that illustrates feature engineering phase in model building platform, in accordance with some embodiments of the present disclosure.

According to some embodiments of the present disclosure, a dataset may be generated for a Machine Learning (ML) model for an increased accurate financial crime detection from an initiation stage of the ML model implementation.

According to some embodiments of the present disclosure, in a computerized system comprising a processor (not shown), a database of financial transaction records such as financial transaction records database 205, and a memory (not shown) to store the database 205. The processor may operate a Representative Dataset Generation (RDG) module.

According to some embodiments of the present disclosure, the RDG module may be configured to retrieve financial transaction records from the database of financial transaction records 205 to arrange a dataset of financial transaction records, according to preconfigured techniques. That is, fraud and clean data sampling 220. The preconfigured techniques may be various sampling methods such as time-based sampling, stratified sampling, or any other type of sampling or any combination thereof.

According to some embodiments of the present disclosure, a data collection of financial transaction records into the financial transaction records database, such as financial transaction records database 205, refers to a process of logging the transaction data along with the run-time calculated fields and model score with respect to the respective transactions. These detection logs mainly comprise a profiled data with respect to the transaction's base activity.

The profile data may be an historical context data that is related to an account or to related entities which are involved in certain transaction. For example, max amount transacted by the account in the past three months. The data may be collected and sent to the ML model building process for further ML model development.

According to some embodiments of the present disclosure, after the received data has been collected and validated for completeness and no missing attributes 210 as per some predefined schema's which assures that the data completeness and data validation for completeness are being operated accordingly. During this operation 210, the fields which are required specific to the ML model building, are checked and in case there are missing attributes, the whole data gets reimported with the missing fields.

According to some embodiments of the present disclosure, before operation 220 of fraud and clean data sampling, the RDG module may further process the financial transaction records in the dataset. The processing of the financial transaction records may include: (i) data validation for completeness and missing attributes 210 and (ii) fraud tagging and fraud enrichment 215 to yield tagged financial transaction records and fraud and clean data sampling.

According to some embodiments of the present disclosure, operation 215 may comprise fraud tagging and fraud enrichment. The fraud tagging may include tagging of the transactions in the detection logs with respect to the fraud transactions provided in fraud files. This tagged data is further used for the data enrichment which includes domain-based enrichment techniques. The data enrichment may include all the activities that enrich the data and make it more typical and representative. For example, futures transactions of users or parties whose previous transactions were tagged as fraudulent, may be marked as suspicious.

According to some embodiments of the present disclosure, operation 220 may comprise fraud and clean data sampling. It may further comprise a process of selecting the sample data to build the ML model from the whole available data. Generally, preferred sampling strategies are time-based sampling, stratified sampling, random sampling and hybrid of mentioned strategies. The sample should be such that it should represent the population (whole data) behavior.

According to some embodiments of the present disclosure, during the feature engineering phase 225 operating: (i) encoding categorical data using inverse probability ratio method 230; and (ii) numerical feature engineering using Gaussian probability density function 235 and then combining by multiplying probabilistic numerical feature transformation along with newly encoded categorical data to generate a complex feature and providing the one or more probabilistic categorical feature, the one or more probabilistic numerical feature and the generated complex feature 240.

In other words, according to some embodiments of the present disclosure, the RDG module may further operate feature engineering such as feature engineering 225, on preselected anomalous related one or more features such as risk-based features, to yield one or more probabilistic categorical features and to yield one or more probabilistic numerical features, and then combine the probabilistic categorical features with the probabilistic numerical features to generate a complex feature dataset i.e. a new dataset providing the one or more probabilistic categorical feature, the one or more probabilistic numerical feature and the complex features dataset 240 to an ML model, thus, increasing the accuracy of detection that is performed right from an initiation stage of the ML model implementation.

According to some embodiments of the present disclosure, operation 225 may comprise feature engineering which is a crucial stage in ML model development. The feature engineering may include the process of engineering the extracted features from the available data which represent the transaction's truthfulness. In other words, feature engineering is the process of using domain knowledge and advance statistical methods to extract features from raw data via data mining techniques.

According to some embodiments of the present disclosure, the inverse probability ratio of occurrence for categorical variables may solve two purposes in financial crime context for categorical data encoding. First, it captures relative distribution of categories in categorical data and second, it highlights rare occurrences which are potentially related to suspicious financial transactions which is what the ML model may detect.

According to some embodiments of the present disclosure, generally, date and time-based features such as transaction hour, transaction amount and location, etc. are the valuable features in the Financial Institution (FI)'s context. The generated feature complex may represent the behavior of transactions more clearly with respect to the ML modelling objective. The respective features may be generated and may be used further to train the model.

According to some embodiments of the present disclosure, the categorical feature engineering may be using an inverse probability ratio method. In a similar manner numeric features are transformed as gaussian Probability Density Function (PDF) to respective probability and subtracting from one e.g., 1-P, to emphasis anomalous observation. The multiplication of probability values received from categorical encoded data using inverse probability ratio function and probability values numeric data may provide a new complex feature as an input for ML modelling.

According to some embodiments of the present disclosure, for a given dataset which may have categorical features that may be denoted as {C1, C2, . . . Cn}, and {C1, C2, . . . Cn} belongs to the given dataset: in univariate scenario, X is categorical feature Cn and it contains value j in categories. Then, inverse probability ratio function for the value "j" in X feature may be depicted as equation (i):

$$IPR(Xj) = \frac{1}{Xj^f} \Big/ \sum \frac{1}{Xj^f}$$

whereby, IPR(Xj) is called as inverse probability ratio and X feature is having values {j1, j2, . . . , jn}. So categorical features may be encoded as {IPR(Xj2), . . . , IPR(Xjn)}. Whereby, {j1, j2, . . . , jn} are categorical values and {IPR(Xj1), IPR(Xj2), . . . , IPR(Xjn)} are numerical values as output from the inverse probability ratio function. The inverse probability ratio calculation is shown in more detail in FIG. 7.

According to some embodiments of the present disclosure, the given dataset may have both categorical and numerical features, where the categorical features are denoted as {C1, C2, . . . Cn} and the numerical features are denoted as {N1, N2 . . . Nm}, and {{C1, C2, . . . Cn}, {N1, N2 . . . Nm}} belong to the given dataset, then the inverse probability ratio may be implemented for the categorical features as described above and for the numerical features it may be estimated probability of its values using its distribution, assuming that the numeric features are following Gaussian distribution.

According to some embodiments of the present disclosure, in case a numeric feature is not following a Gaussian distribution, then, the feature may be transformed close to Gaussian distribution, using suitable transformation method depending on its actual distribution.

For example, if Xi is a variable of continuous numbers and {i=1, 2, . . . , n), it may follow creation distribution. For calculating probability of random number that is present in this variable it has to transform the Xi to attain normal distribution. There are various methods for such transformation, for example: if a distribution is left skewed then the functions: [log(x)] and [√x] may be applied to transform for normal distribution. Similarly, if the variable is right skewed then the functions: [log(x/1−x)] or [0.5×log((1−x)/(1+x))] may be applied for normal distribution.

According to some embodiments of the present disclosure, the Gaussian distribution is a suitable continuous distribution because a sufficient number of random variables which are occurring in practice may be approximated to it.

According to some embodiments of the present disclosure, the Gaussian Probability Density Function (PDF) may calculate the probability of a value given the mean and standard deviation of the distribution from which it came. The Gaussian PDF may be calculated as follows in equation (ii):

$$pdf(x, \text{mean}, sd) = \frac{1}{\sqrt{2 \times \pi} \times sd} \times e^{-\left(\frac{(x-\text{mean})^2}{2 \times sd^2}\right)} \quad \text{(ii)}$$

whereby, pdf(x) is the Gaussian PDF, mean,
'sd' are the mean and standard deviation,
π is the numerical constant PI,
e is Euler's number raised to a power, and
x is the input value for the input variable.

According to some embodiments of the present disclosure, it is assumed that the one or more input features are each drawn from a Gaussian distribution. By calculating the mean and standard deviation of each input variable from the training dataset, the Gaussian PDF may be used to estimate the likelihood of each value for each attribute. Corresponding probability values may be calculated for values in numeric feature by using {1-p} formula, where 'p' represents the probability value, to highlight anomalous values in the distribution. Accordingly, the numerical feature 'N' with values between a minus constant 'inf' and a constant 'inf', may be converted to its corresponding probability values, where probability values are between 0 and 1.

According to some embodiments of the present disclosure, this new generated dataset, i.e., the new complex dataset of probabilistic features may be representative of the whole data and accordingly when it may be provided to an ML model it may enable the ML model to identify actual fraud pattern right from the initiation stage of the ML model.

According to some embodiments of the present disclosure, since the features in the new generated dataset of complex features which is representative of the whole data, are anomalous related, such as risk-based related, it may also contribute to the ML model operation in differentiating actual anomalies or potential fraud which is anomaly by its nature. The contribution of feature engineering of anomalous related features is shown in detail, in FIGS. 3A-3B.

According to some embodiments of the present disclosure, modeling the anomalous related features, such as risk-based features, requires factoring attribute values among and relative to other values in the categorical features. As opposed to existing or traditional ML feature encoding approaches which rely on generic behaviors of features without considering the anomalous aspect of the features.

According to some embodiments of the present disclosure, the combination of inverse probability ratio and complex feature, based on Gaussian Probability Density Function (PDF) feature encoding for numerical variables may strengthen the accuracy of the ML model for detecting anomalous data.

According to some embodiments of the present disclosure, calculating an anomaly behavior such as risk e.g., fraud, by directly using encoded features, may provide an increased level of accuracy for risk identification.

According to some embodiments of the present disclosure, operations 250 and 255 may comprise anomaly detection model tuning and training, respectively. The anomaly detection model may be used whether there is no sufficient fraud data or when there is sufficient fraud data. Any identified outlier activity may be considered as suspicious and more prone to be a fraud.

According to some embodiments of the present disclosure, the operation of anomaly detection model tuning 250 may comprise a process of fitting the engineered features to the ML model, so that the ML model algorithm will be able to learn them effectively and may perform a pattern identification for anomalous behavior or non-anomalous activity, and any financial transaction that is deviating from the pattern identification for non-anomalous behavior, may be considered as anomaly financial transaction such as, fraud based on a risk score provided by the anomaly detection ML model.

According to some embodiments of the present disclosure, the training process 255 may be performed over a training data which may be a sub-sample of the initial sampled data. It also may include tuning and optimization phases, which fine-tunes the ML model and optimizes its performance using a set of hyperparameters, which are parameters whose value is set before the learning process begins.

According to some embodiments of the present disclosure, if there is no sufficient fraud data available then an unsupervised modeling may be operated or when sufficient fraud data is present 265, then, the ML model tuning, training and testing may be performed by: (a) Anomaly Detection Model (ADM) tuning 250; (b) ADM training 255; and (c) ADM testing and validation 260. The ADM tuning, ADM training and ADM testing and validation may be performed according to an unsupervised ML model, such as Isolation Forest model. The significance of the Isolation Forest model will be explained in more detail in FIGS. 3A-3B.

According to some embodiments of the present disclosure, The ADM tuning, ADM training and ADM testing and validation may be performed according to a supervised ML model.

According to some embodiments of the present disclosure, once the anomaly detection model gets trained, the performance of anomaly detection model may be evaluated using unseen data such as test data, which is a subset of the initial sampled data. The prediction results may be compared with fraud data in case there are enough fraud data present or, if there is not enough fraud data then transactions which are marked as anomaly may be analyzed to check what outlier behavior have affected the anomaly scoring on the test data. In case, the results are not up to the mark, then the tuning and training of the anomaly detection model e.g., operation 250 and operation 255 may start again.

According to some embodiments of the present disclosure, if sufficient fraud data is present 265 then a supervised modeling may be operated by operations 270 and 275 may be operated following by operation 280. Operations 270 and 275 may comprise Supervised Model (SVM) training and tuning. The SVM training may include the process of fitting the engineered features i.e., model training may be performed by a model library and may be dependent on model implementation to the ML model, so that the ML model may learn them effectively and may easily classify an incoming financial transaction as a fraud or non-fraud, based on a risk score. The training process may be applied on a training dataset which is a sub-sample of the retrieved data, e.g., the initial sampled dataset.

According to some embodiments of the present disclosure, operations 270 and 275 may include tuning and optimization phases which fine-tunes the ML model and optimizes its performance.

According to some embodiments of the present disclosure, operation 280 may comprise SVM validation and testing. Once the SVM gets trained, the performance of ML model may be evaluated by using unseen dataset e.g., test dataset, which is a subset of the initial sampled dataset. Prediction results on the test dataset may express the ML model performance and its robustness. When the prediction results are not up to the mark, then, the tuning training model may be restarted.

According to some embodiments of the present disclosure, SVM training and tuning processes may be used by the classification model to classify fraud and non-fraud transactions. Support-vector machines are supervised learning models with associated learning algorithms that analyze data used for classification and regression analysis. Given a dataset of training examples, each example marked as belonging to one or the other of fraud and non-fraud categories, an SVM training algorithm may build a model that assigns new examples to one fraud or non-fraud, making it a non-probabilistic binary linear classifier.

According to some embodiments of the present disclosure, the SVM model is a representation of the examples as points in space, mapped so that the examples of the separate categories are divided by a clear gap that is as wide as possible. New examples are then mapped into that same space and predicted to belong to a category based on the side of the gap on which they fall.

FIG. 3A is a table 300A of an anomaly score output from an Isolation Forest model, in accordance with some embodiments of the present disclosure.

According to some embodiments of the present disclosure, the Isolation Forest model may learn the non-anomalous pattern and the outliers, i.e., anomalous patterns from the dataset by using multiple tree data structure models. The tree data structure simulates a hierarchical tree structure, with a root value and subtrees of children with a parent node, represented as a set of linked nodes. A leaf in these tree data structures may be any instance with less branching which means that the tree data structure may find an outlier point with less branching as outlier in a sparse region, whereas non-anomalous data points may be in a dense region, so the tree data structure have to branch out more in order to isolate any non-anomalous data point in the dense region, hence, the probability of that instance being an outlier i.e., anomaly may be high as the region in the dataset is sparse and not dense.

According to some embodiments of the present disclosure, the anomaly detection model may provide a risk score for each financial transaction, based on an analysis on the overall risk score on the dataset, e.g., training data. The risk score may vary between −1 to 1 as shown in table 300A. An anomaly score, e.g., risk score, close to −1 may be considered as more anomalous in comparison to financial transactions having a score close to 0. Accordingly, financial transactions 'T1' and 'T2' may be considered anomalous e.g., fraud and transactions 'T3', 'T4' and 'T5' may be considered non-anomalous, e.g., non-fraud.

FIG. 3B is a graph 300B, showing the probability density function on Isolation forest anomaly detection risk score, in accordance with some embodiments of the present disclosure.

According to some embodiments of the present disclosure, the probability density function for the anomaly score, e.g., risk score may be plotted for both fraud and non-fraud financial transactions. The x-axis 310b represents a risk score and the y-axis 320b represents probability density.

According to some embodiments of the present disclosure, fraud transactions, such as 'T1' and 'T2' in FIG. 3A and non-fraud transactions 'T3', 'T4' and 'T5' in FIG. 3A are having different distributions. The fraud distribution is denoted by 340b and non-fraud distribution is denoted by 330b. Therefore, graph 300B demonstrates that the implementation of feature engineering such as feature engineering phase that is operated in Representative Dataset Generation (RDG) module, which is shown in FIGS. 2A-2B, distinguishes between anomalous and non-anomalous data and contributes in modeling the anomaly detection model.

Figure 4:
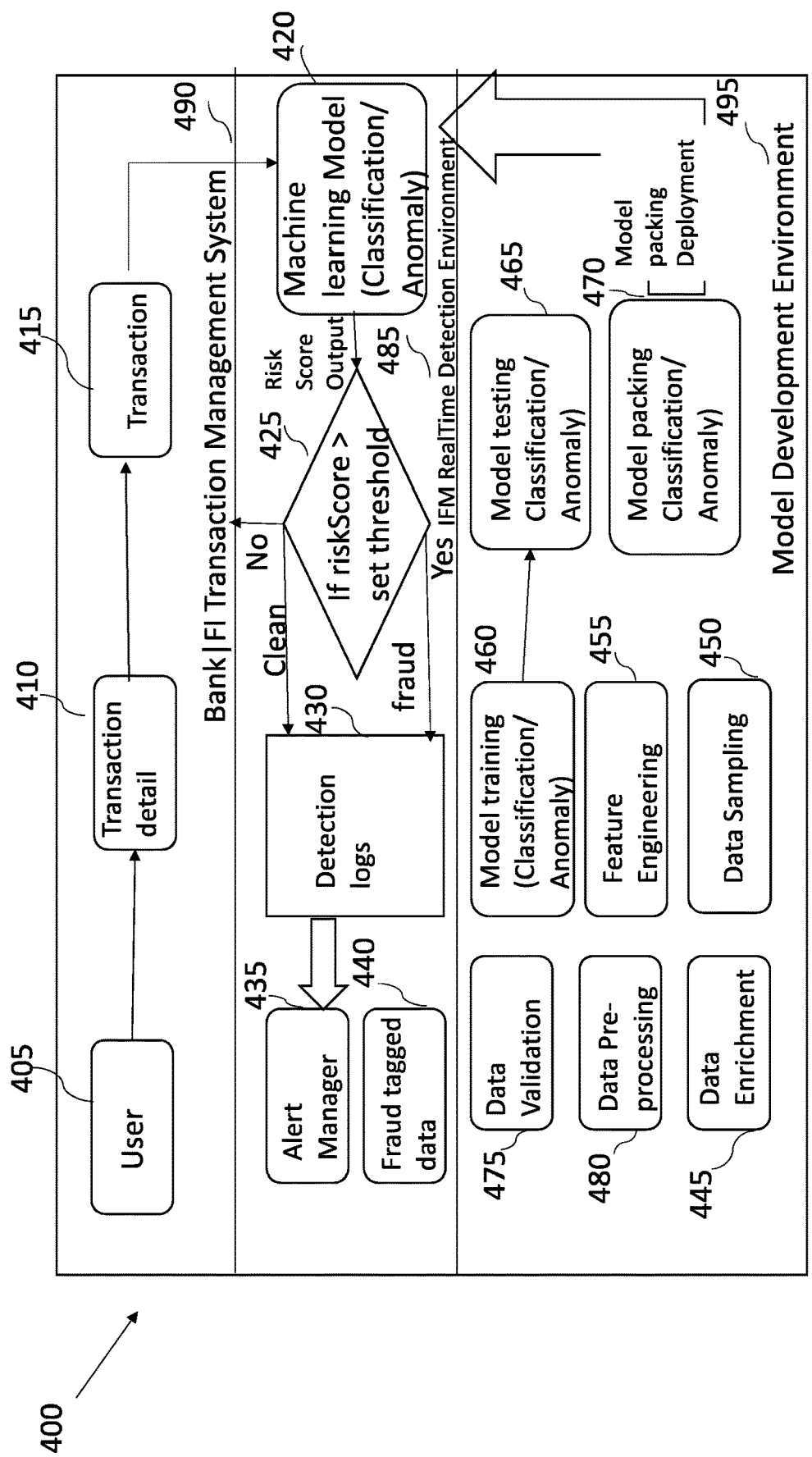
FIG. 4 is a high-level diagram of a model development environment, in accordance with some embodiments of the present disclosure.

FIG. 4 is a high-level diagram of a model development environment, in accordance with some embodiments of the present disclosure.

According to some embodiments of the present disclosure, a Financial Institution (FI) is a company engaged in the business of dealing with financial and monetary transactions such as deposits, loans, investments, and currency exchange. It has its's own financial transaction management system such as bank/FI transaction management system 490, for maintaining users' financial transactions. A financial transaction is an agreement, or communication, carried out between a buyer and a seller to exchange an asset for payment. It involves a change in the status of the finances of two or more entities e.g., businesses or individuals.

According to some embodiments of the present disclosure, a user 405 may be an entity who is having authority and responsibility for enabling the flow of money transfer. A user 405 may use one of the available channels, such as digital or physical banking, to initiate the financial transaction 415 by putting the required details 410 such as payee details and transaction amount, etc. A financial transaction channel is a chain of businesses or intermediaries through which a money passes until it reaches the payee. Transaction channels can include ATM's, Mobile Banking Applications, Cheques or Internet Banking. Accordingly, the financial transaction management system such as bank/FI transaction management system 490 may forward the financial transaction 415 to an Information Maintenance (IFM) Real Time (RT) detection environment, such as IFM RT detection environment 485, which is a system which runs on top of financial organizations servers and every financial transaction that is initiated by a user is passing through it and being processed by it.

According to some embodiments of the present disclosure, the IFM RT detection environment, such as RT detection environment 485 may include a machine learning model that is deployed in the financial transaction management system 420 for classification of the financial transaction or for anomaly detection may calculate and attribute a risk score to the financial transaction 415 according to its details 410.

An IFM Real Time Detection System is the place where the machine learning models run. The machine learning models could be classification or anomaly detection models for fraud identification and prevention. Every financial transaction may pass through this system, and with the help of the account sender, beneficiary and other financial transaction details for detection process, it evaluates and raises an alert for a financial transaction if found as suspicious. The financial transaction management system 420 is Machine Learning Deployed model(s) which is the deployed model through which, all the financial transactions pass and being evaluated based on values of its features to provide each financial transaction a risk score. The Machine Learning Deployed model may be a classification model or an anomaly detection model or a combination thereof e.g., a hybrid model. The financial transactions which are found clean go back to financial transaction management system for further processing. Then, the raised alert is being transferred to the Alert Manager 435 for further evaluation and analysis where an analyst manually checks the financial transactions and makes the final decision about it by tagging data as fraud 440.

According to some embodiments of the present disclosure, in case the attributed risk score is above a set threshold 425 the financial transaction is marked as fraud and blocked. If the risk score is below the set threshold it is marked as clean. The marked transactions may be stored in detection logs 430. A financial fraud is the crime of gaining money or financial benefits by deception or criminal activity. If the financial transaction risk score is less than threshold then it's sent back to bank/FI transaction management system 490 for further processing.

According to some embodiments of the present disclosure, the Alert manager 435 refers to an application having a user interface, where the alerts are evaluated manually by an analyst that observes the financial transaction details 410 along with the output values provided by the detection system and manually marks it as a fraud or clean. The results may be extracted as fraud files and then sent back to the model building environment.

According to some embodiments of the present disclosure, the detection logs 430 refer to the data which is a result of the process of logging the financial transaction data along with the run-time calculated fields and model risk score with respect to the financial transactions. This data mainly comprises the profiled data with respect to the transaction's base activity. The Data is being collected and sent to the model development environment 495 for the further model creation.

According to some embodiments of the present disclosure, the model development environment such as model development environment 495, may be a platform where actual model building is performed. The received data may be aggregated and made available to the data scientists for further development. As a part of the model development, there are certain phases which are being executed sequentially to complete the model building process. This platform may be cloud based and all the financial transaction logs such as detection logs 430 and fraud tagged data 440 may be received for modeling purpose.

According to some embodiments of the present disclosure, an operation of a data validation 475 may be performed when the received data may be collected and validated as per some predefined configuration which assures the data completeness. The fields which are required specific to the model building e.g., anomalous related features may be checked and in case of missing attributes, the whole data gets reimported with the corrected or missing fields.

According to some embodiments of the present disclosure, an operation of data pre-processing 480 may be performed. The data pre-processing 480 may include steps such as data cleaning, removal of corrupted and unwanted data, and data type correction. Then, the data may be uploaded for further processing.

According to some embodiments of the present disclosure, an operation of data enrichment 445 may be performed. The data enrichment 445 may include all the activities which enrich the data and make it more representative to the data as a whole. The initial activity may be fraud tagging which includes tagging the financial transactions which were received in detection logs, such as detection logs 430, with respect to the fraud transactions provided in fraud files. Tagged data such as fraud tagged data 440, may be further used for the data enrichment operation 445 which includes the domain-based i.e., relevant enrichment techniques.

According to some embodiments of the present disclosure, an operation of data sampling 450 may be performed. The data sampling 450 may include the process of selecting the sample data to build the machine learning model from the whole available data. Preferred data sampling strategies are time-based sampling, stratified sampling, random sampling and hybrid of mentioned strategies. The data sample should be such that it should represent the population i.e., whole data, behavior.

According to some embodiments of the present disclosure, an operation of feature engineering 455 may be performed. The feature engineering 455 is a significant stage in the model development process. The feature engineering operation 455 may include the process of engineering the extracts from the available data which represents the financial transaction's truthfulness. In a non-limiting example, the features may be: date and time-based features, such as transaction hour, transaction amount, location, etc. are the anomalous related features in the context of the financial institutions because they represent the behavior of financial transactions more clearly with respect to the modeling objective. The features may be created and may be used further to train the model.

According to some embodiments of the present disclosure, an operation of model training 460 may be performed. The model training operation 460 may include the process of fitting the engineered features to the model so that the ML model may learn them effectively and may be able to easily classify an incoming financial transaction as a fraud or non-fraud based on a risk score. The ML model training operation 460 may be performed over training data which may be a sub-sample of the initial sampled data. It also includes the tuning and optimization phases which fine-tune the model and optimize its performance.

According to some embodiments of the present disclosure, an operation of model validation, i.e., model testing 465 may be performed. The ML model testing 465 of the ML model classification or anomaly detection, may be performed after the ML model gets trained, the performance of ML model may be evaluated using unseen data which is validation data. The validation data may be a subset of the initial sampled data. Prediction results on the validation data may measure the model performance and its robustness. If results are not up to the mark, the model training may start again.

According to some embodiments of the present disclosure, after prediction results on the validation data are matching the yielded results an operation of packaging and deployment 470 in a production environment may be performed.

According to some embodiments of the present disclosure, the operation of packaging and deployment 470 may include packaging the ML model as an executable and deploying it in production environment. A transaction server (not shown) may call the deployed executable and provide it with the necessary input data with required features, that is related to a financial transaction to receive prediction results i.e., anomaly detection and classification score with respect to the financial transaction. The necessary input data i.e., required input features may be learnt during model training process.

According to some embodiments of the present disclosure, whenever a user 405 initiates a financial transaction 415 via a channel, the transaction 415 may pass through the bank/FI transaction management system such as bank/FI transaction management system 490 and may be forwarded to a real-time detection system. Once the mode package is deployed in the production environment, a live transaction may pass through the same for risk detection. The master data may pass through the initial pre-processing and feature engineering logic in order to clean the data and generate the necessary features out of it.

According to some embodiments of the present disclosure, the probabilistic features i.e., anomalous related features may be created in the feature engineering stage 455. The newly generated anomalous related features along with some existing features may go through model object and predictions may be returned in response. Based on the prediction results an alert may be raised and sent to a respective front-end system for further investigation.

Figure 5:
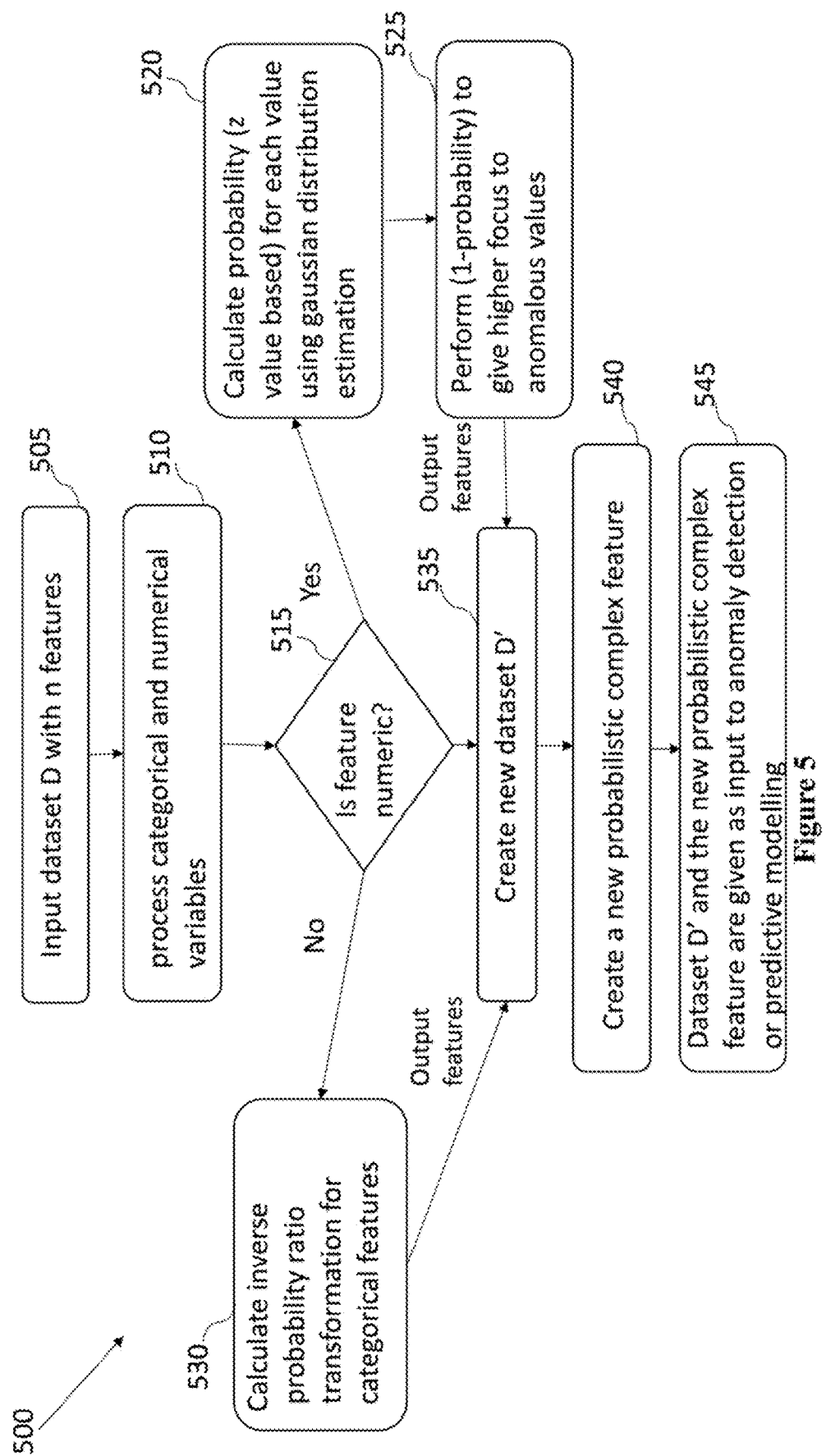
FIG. 5 is a high-level diagram of a method to generate a dataset 'D' to be later on provided as an input to an anomaly detection or predictive modelling.

FIG. 5 is a high-level diagram of a method to generate a dataset 'D" to be later on provided as an input to an anomaly detection model or to predictive modelling.

According to some embodiments of the present disclosure, operation 505 may comprise input of a dataset D with n preselected transaction features representing characteristics of transactions which are anomalous related features.

According to some embodiments of the present disclosure, operation 510 may comprise processing categorical and numerical variables of the dataset D.

According to some embodiments of the present disclosure, operation 515 may comprise checking if a feature is numeric.

According to some embodiments of the present disclosure, if a feature is numeric, operation 520 may comprise calculating probability (z value based) for each value using gaussian distribution estimation According to some embodiments of the present disclosure, if a feature is numeric, then after performing operation 520 performing operation 525 which may comprise performing (1-probability) to highlight anomalous values.

According to some embodiments of the present disclosure, if a feature is not numeric, e.g., categorical, then, operation 530 may comprise calculating inverse probability ratio transformation for categorical features.

According to some embodiments of the present disclosure, the output features of operations 525 and 530 may be combined to create new dataset D'.

According to some embodiments of the present disclosure, operation 540 may comprise creating a new probabilistic complex feature by applying a function such as IPR $(C1) \times IPR(C2) \times \ldots \times IPR(Cn) \times P(N1) \times P(N2) \times \ldots \times P(Nm)$.

According to some embodiments of the present disclosure, operation 545 may comprise providing Dataset D' and the new probabilistic complex feature are given as input to anomaly detection or predictive modelling.

According to some embodiments of the present disclosure, inverse probability ratio is a probability-based feature encoding approach for categorical data i.e., categorical variables or categorical features. The approach aims to find relative distribution of a value with respect to other values associated with that categorical feature as well as to highlight anomalous values.

In a non-limiting example, a dataset 'D' may include both categorical and numeric features or columns. The categorical features may be denoted as $\{C1, C2, \ldots Cn\}$ and the numerical feature may be denoted as $\{N1, N2 \ldots Nm\}$. Whereby, $\{\{C1, C2 \ldots Cn\}, \{N1, N2 \ldots Nm\}\}$ belongs to dataset 'D'. Accordingly, in a univariate scenario, 'X' may be categorical feature Cn and may include a value 'j' in categories. For example, a county code may be a single feature, and that feature may have values which are reffered to as a categories, like "US", "India" etc., where each one is category. Then, the inverse probability ratio function for the value 'j' in X feature may be depicted as equation (i):

$$IPR(Xj) = \frac{1}{Xj^f} / \sum \frac{1}{Xj^f} \qquad \text{(i)}$$

whereby, IPR(Xj) is the inverse probability ratio, and 'X' feature may have the following values: {j1, j2, . . . jn}.

According to some embodiments of the present disclosure, the categorical features may be encoded as {IPR(Xj2), . . . , IPR(Xjn)}.

Whereby, {j1, j2, . . . , jn} are categorical values and {IPR(Xj1), IPR(Xj2), . . . , IPR(Xjn)} are numerical values, as output from the inverse probability ratio function.

According to some embodiments of the present disclosure, in a similar manner, the numerical features which may be denoted as {N1, N2 . . . Nm} in dataset 'D' may be represented in a form of an estimated probability of its values using its distribution, assuming that the numeric feature is following a Gaussian distribution.

According to some embodiments of the present disclosure, when a numeric feature is not following a Gaussian distribution, then, the feature may be transformed close to Gaussian distribution using suitable transformation method depending on its actual distribution.

According to some embodiments of the present disclosure, the Gaussian distribution may be applied due to its continuous distribution and for its sufficient number of random variables which are occurring in practice i.e., 'real-life' dataset, may be approximated to it.

According to some embodiments of the present disclosure, a Gaussian Probability Density Function (PDF) may calculate the probability of a value given the mean and standard deviation of the distribution from which it came from. The Gaussian PDF may be calculated as follows in equation (ii):

$$pdf(x, \text{mean}, sd) = \frac{1}{\sqrt{2 \times \pi} \times sd} \times e^{-\left(\frac{(x-\text{mean})^2}{2 \times sd^2}\right)} \qquad \text{(ii)}$$

whereby, pdf(x) is the Gaussian PDF,

The mean and 'sd' are the mean and standard deviation calculated above, $\pi$ is a numerical constant PI, (approximately equal to 3.14159), and x is the input value for the input variable.

According to some embodiments of the present disclosure, the input variables are assumed to be each drawn from a Gaussian distribution. By calculating the mean and standard deviation of each input variable from a training data such as dataset 'D', the Gaussian PDF may be used to estimate the likelihood of each value for each attribute.

According to some embodiments of the present disclosure, corresponding probability values for values in numeric feature may be found by using {1-p} formula to highlight anomalous values in the distribution. Therefore, numeric feature 'N' with values between −inf and inf, may be converted to its corresponding probability values where probability values are between 0 and 1.

According to some embodiments of the present disclosure, categorical features {C1, C2, . . . Cn) may be encoded as {IPR(C1), IPR(C2), . . . IPR(Cn))}. In a similar manner, numerical features {N1, N2 . . . Nm} may be transformed to its corresponding probabilities (P(N1), P(N2) . . . P(Nm)}. Accordingly, resulting in a new dataset 'D" where {{IPR (C1), IPR(C2), . . . IPR(Cn)}, {P(N1), P(N2) . . . P(Nm)}} belongs to D'. The novel complex probability feature which is part of D' can be calculated as:

Probabilistic complex feature=IPR(C1)×IPR(C2)× . . . ×IPR(Cn)×P(N1)×P(N2)× . . . ×P(Nm), whereby, it's the multiplication of all new features in new dataset 'D" encoded from dataset 'D'. The new dataset 'D' and the complex feature, may be given as an input to any "anomaly detection algorithm" or "predictive algorithm" for modeling.

Figure 6:
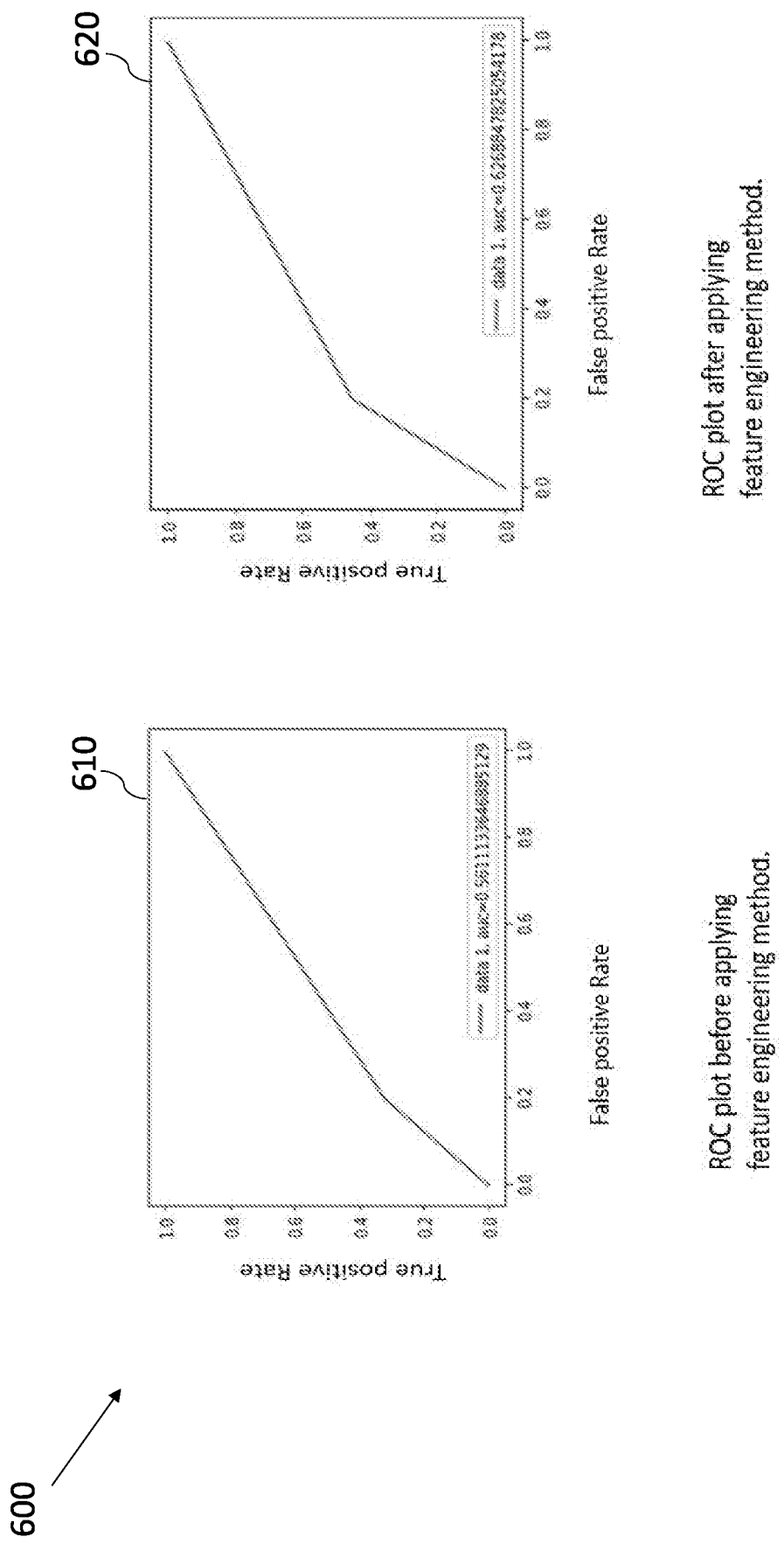
FIG. 6 is showing Receiver operating characteristic (ROC) Plot before and after applying feature engineering on anomalous related features, in accordance with some embodiments of the present disclosure.

FIG. 6 is showing Receiver Operating Characteristic (ROC) Plot before 610 and after applying feature engineering 620 on anomalous related features, in accordance with some embodiments of the present disclosure.

According to some embodiments of the present disclosure, a Supervised model (SVM) has been used as the classification model to classify fraud and non-fraud financial transactions. Support-vector machines are supervised learning models with associated learning algorithms that analyze data used for classification and regression analysis. Given a set of training examples, each example marked as belonging to fraud category or to non-fraud category, an SVM training algorithm builds an ML model that assigns new examples to either fraud or non-fraud, thus, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on the side of the gap on which they fall.

According to some embodiments of the present disclosure, the initial sampled data with engineered features is used for model training to have 60% part of the initial sampled data. Test and validation each have around 20% of data which is used for model results validation purpose. Features and target label, i.e., target variables, such as fraud or clean labels, are provided to train the ML model. The ML Model is trained on the input and target labels and its performance is validated against test and validation dataset. Graphs 610 and 620 show the accuracy on train and validation for each epoch. There is an increase in the Area Under the Curve (AUC) score of the ML model when applying feature engineering on anomalous related features.

The AUC is used in classification analysis in order to determine which of the used models predicts the classes best. An example of its application are ROC curves. In graphs 610 and 620, the true positive rates are plotted against false positive rates. The AUC is calculated by using false positive rate and true positive rate considering each probability points in the prediction outcome as threshold.

The AUC represents the probability that a random positive example e.g., non-fraud financial transaction is positioned to the right of a random negative e.g., fraud example. The AUC ranges in values from 0 to 1. An ML model whose predictions are 100% wrong has an AUC of 0.0; An ML model whose predictions are 100% correct has an AUC of 1.0.

It is clear that in graph 620, i.e., after applying feature engineering method, there are more true positives than false positives, compared to graph 610, which is before applying feature engineering method.

FIG. 7 shows results of a calculation 700 of inverse probability ratio of occurrences for categorical variables, in accordance with some embodiments of the present disclosure.

According to some embodiments of the present disclosure, table 710a shows occurrences of a country code, each row represents a financial transaction.

According to some embodiments of the present disclosure, table 720 shows the frequency of each country code in the data. Liberia and UK have a very low frequency for that type of transaction or client segment. Liberia 730 has 1 frequency and the UK 740 has frequency of 5. The other countries such as the USA 745 has frequency of 70,000. Liberia 730 and UK 740 are the anomalous data.

According to some embodiments of the present disclosure, the inverse frequency is calculated by 1/frequency.

According to some embodiments of the present disclosure, the Inverse Probability Ratio of occurrence for categorical variables is calculated by equation (i):

$$IPR(Xj) = \frac{1}{Xj^f} / \sum \frac{1}{Xj^f}$$

According to some embodiments of the present disclosure, for Liberia 730 and UK 740 the result of the inverse probability ratio is significantly higher than the result of the inverse probability ratio for the other countries, thus it is highlighted.

FIG. 8 shows results of a calculation 800 of feature complex, in accordance with some embodiments of the present disclosure.

According to some embodiments of the present disclosure, table 810 shows a list of financial transactions having a categorical feature country code and numerical feature, transaction value.

According to some embodiments of the present disclosure, the transaction value of t9 840 is 493$ and the country code is of USA which is not an anomalous data. The value of t11 845 is 420$ and the country code is of UK which is an anomalous data.

According to some embodiments of the present disclosure, the complex feature of t9 is much lower than the complex feature of t11 even when both have approximately the same transaction value.

According to some embodiments of the present disclosure, the feature with the rare occurrence will be given more weightage compared to the feature with more occurrence. The t11 got more weightage due to its rare occurrence. The frequency of the t11 is '5' as shown in element 740 in table 720 in FIG. 7, which is much lower compared to the t9 which is 7000, element 745 in FIG. 7. Since the occurrence is higher in t9, as shown by compatible element 740 in FIG. 7, it will result in decrease in the inverse probability value in the numerator while calculating the IPR. As the low IPR value of t9 get multiply with other IPR values, the resulted complex feature will have a much lower value compared to complex fracture value of t11 which its occurrence is shown in element 745 in FIG. 7.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What we claim:

1. A computerized-method for generating a dataset for a Machine Learning (ML) model for an increased accurate financial crime detection from an initiation stage of the ML model implementation, said computerized-method comprising:

in a computerized system comprising a processor, a database of financial transaction records; a memory to store the database, said processor is configured to operate a Representative Dataset Generation (RDG) module, said RDG module is configured to:

retrieving financial transaction records from the database of financial transaction records to arrange a dataset of financial transaction records, according to preconfigured techniques;

processing the financial transaction records in the dataset;

operating feature engineering on preselected anomalous related one or more features to yield: (i) one or more probabilistic categorical features to be encoded using inverse probability ratio and (ii) one or more probabilistic numerical features to be encoded using Gaussian probability density function, and combining the probabilistic categorical features with the probabilistic numerical features to generate a complex features dataset, wherein the complex features dataset is created by applying a function wherein the function is IPR(C1)×IPR(C2)× . . . ×IPR(Cn)×P(N1)×P(N2)× . . . ×P(Nm), and providing the one or more probabilistic categorical features, the one or more probabilistic numerical features and the complex features dataset to an ML model for classification of a financial transaction by calculating and attributing a risk score thereof, wherein said ML model is deployed in a financial transaction management system in an Information Maintenance (IFM) Real Time (RT) detection environment, wherein said ML model is sending back to the financial transaction management system a financial transaction having an attributed risk score less than a threshold, for further processing, and wherein said ML model is sending an alert as to a financial transaction having an attributed a risk score above the threshold to an alert manager application having a User Interface (UI), to be presented and manually evaluated and tagged by an analyst via the UI, thus, increasing an accuracy of the classification of the financial transaction that is performed right from an initiation stage of the ML model implementation and marks the financial transaction as fraud when its attributed risk score is above a preconfigured threshold.

2. The computerized-method of claim 1, wherein the processing of the financial transaction records in the dataset is further performed by performing:

(i) data validation for completeness and missing attributes on the retrieved financial transaction records; and (ii) fraud tagging and fraud enrichment to yield tagged financial transaction records.

3. The computerized-method of claim 2, wherein after providing the one or more probabilistic categorical features, the one or more probabilistic numerical features and the complex feature dataset to the ML model, when the number of yielded tagged financial transaction records is above a predefined threshold, the RDG module is further configured to perform: (i) Supervised Model (SVM) tuning; (ii) SVM training; and (iii) SVM testing and validation.

4. The computerized-method of claim 1, wherein after providing the one or more probabilistic categorical features, the one or more probabilistic numerical features and the complex feature dataset to the ML model the RDG module is further configured to performing model tuning, training and testing.

5. The computerized-method of claim 4, wherein the model tuning, training and testing is performed by Anomaly Detection Model (ADM) tuning; (b) ADM training; and (c) ADM testing and validation.

6. The computerized-method of claim 5, wherein the ADM tuning, ADM training and ADM testing and validation is performed according to an Isolation Forest algorithm.

7. The computerized-method of claim 1, wherein the preconfigured techniques include: random sampling, time-based sampling, stratified sampling, other type of sampling or any combination thereof.

8. A computerized-system for generating a dataset for a Machine Learning (ML) model for an increased accurate financial crime detection from an initiation stage of the ML model implementation, said computerized-system comprising:

a processor;

a database of financial transaction records;

a memory to store the database, said processor is configured to operate a Representative Dataset Generation (RDG) module, said RDG module is configured to:

retrieving financial transaction records from the database of financial transaction records to arrange a dataset of financial transaction records, according to preconfigured techniques;

processing the financial transaction records in the dataset;

operating feature engineering on preselected anomalous related one or more features to yield: (i) one or more probabilistic categorical features to be encoded using inverse probability ratio and (ii) one or more probabilistic numerical features to be encoded using Gaussian probability density function, combining the probabilistic categorical feature with the probabilistic numerical feature to generate a complex features dataset, wherein the complex features dataset is created by applying a function wherein the function is IPR(C1)×IPR(C2)× . . . ×IPR(Cn)×P(N1)×P(N2)× . . . ×P(Nm), providing the one or more probabilistic categorical features, the one or more probabilistic numerical features and the complex features dataset to an ML model for classification of a financial transaction by calculating and attributing a risk score thereof, wherein said ML model is deployed in a financial transaction management system in an Information Maintenance (IFM) Real Time (RT) detection environment, wherein said ML model is sending back to the financial transaction management system a financial transaction having an attributed risk score less than a threshold, for further processing, and wherein said ML model is sending an alert as to a financial transaction having an attributed a risk score above the threshold to an alert manager application having a User Interface (UI), to be presented and manually evaluated and tagged by an analyst via the UI, thus, increasing an accuracy of the classification of the financial transaction that is performed right from an initiation stage of the ML model implementation and marks the financial transaction as fraud when its attributed risk score is above a preconfigured threshold.

9. The computerized-system of claim 8, wherein the processing of the financial transaction records in the dataset is further performed by performing:

(i) data validation for completeness and missing attributes on the retrieved financial transaction records; and (ii) fraud tagging and fraud enrichment to yield tagged financial transaction records.

10. The computerized-system of claim 9, wherein after providing the one or more probabilistic categorical features, the one or more probabilistic numerical features and the complex feature dataset to the ML model, when the number of yielded tagged financial transaction records is above a predefined threshold, the RDG module is further configured to perform: (i) Supervised Model (SVM) tuning; (ii) SVM training; and (iii) SVM testing and validation.

11. The computerized-system of claim 8, wherein after the one or more probabilistic categorical features, the one or more probabilistic numerical features and providing the complex feature dataset to the ML model the RDG module is further configured to performing model tuning, training and testing.

12. The computerized-system of claim 11, wherein the model tuning, training and testing is performed by Anomaly Detection Model (ADM) tuning; (b) ADM training; and (c) ADM testing and validation.

13. The computerized-system of claim 12, wherein the ADM tuning, ADM training and ADM testing and validation is performed according to an Isolation Forest algorithm.

14. The computerized-system of claim 8, wherein the preconfigured techniques include: random sampling, time-based sampling, stratified sampling, other type of sampling or any combination thereof.

* * * * *